(12) United States Patent
Lai

(10) Patent No.: US 11,487,108 B2
(45) Date of Patent: Nov. 1, 2022

(54) EXTENDED MACRO TO WIDE ANGLE CONVERSION LENS

(71) Applicant: Nauticam Holdings Limited, Fo Tan (HK)

(72) Inventor: Yuk Shing Lai, Fo Tan (HK)

(73) Assignee: NAUTICAM HOLDINGS LIMITED, Fo Tan (HK)

( * ) Notice: Subject to any disclaimer, the term of this patent is extended or adjusted under 35 U.S.C. 154(b) by 330 days.

(21) Appl. No.: 16/830,639

(22) Filed: Mar. 26, 2020

(65) Prior Publication Data

US 2020/0319454 A1    Oct. 8, 2020

Related U.S. Application Data

(60) Provisional application No. 62/830,897, filed on Apr. 8, 2019.

(51) Int. Cl.
*G02B 9/12* (2006.01)
*G02B 27/00* (2006.01)
(Continued)

(52) U.S. Cl.
CPC .......... *G02B 27/0025* (2013.01); *G02B 7/14* (2013.01); *G02B 13/0095* (2013.01); *G03B 17/14* (2013.01); *G03B 17/565* (2013.01)

(58) Field of Classification Search
CPC .. G02B 27/0025; G02B 7/14; G02B 13/0095; G03B 17/14; G03B 17/565
(Continued)

(56) References Cited

U.S. PATENT DOCUMENTS

| 2002/0196980 A1 | 12/2002 | Dowski, Jr. |
| 2006/0138873 A1* | 6/2006 | Yasuda ................. G02B 7/102 |
| | | 359/701 |

(Continued)

FOREIGN PATENT DOCUMENTS

| CN | 101208626 A | 6/2008 |
| GB | 1 500 495 A | 2/1978 |

(Continued)

OTHER PUBLICATIONS

International Search Report issued in International Patent No. PCT/EP2020/059290 dated Aug. 31, 2020.

*Primary Examiner* — William Choi
(74) *Attorney, Agent, or Firm* — Nixon & Vanderhye

(57) ABSTRACT

Disclosed is an interchangeable conversion lens for underwater photography or cinematography able to change from macro to wide angle photographic perspectives and consists of a sequential assembly of optical lens elements. This conversion lens includes an objective lens, a relay lens and a focusing unit which are positioned on an optical axis and are interrelated in their optical performance to one another. The objective lens is to form an intermediate image (reversed and inverted) from wide angle perspective to half the size of the sensor in the camera, this intermediate image is then transmitted through the relay lens and the focusing unit which projects the image through a macro lens into the sensor of a camera. The three parts can be disassembled and reassembled underwater, all three separate parts are waterproof and therefore the optical performance of water is taken into consideration in the optical system. The length of this lens can be extended or reduced, and the three individual parts can be changed according to personal preferences. This provides a flexible underwater optical system that can easily (Continued)

be changed in water between macro and wide angle perspectives, depending on the photographer's needs.

14 Claims, 10 Drawing Sheets

(51) Int. Cl.
  *G02B 7/14* (2021.01)
  *G02B 13/00* (2006.01)
  *G03B 17/14* (2021.01)
  *G03B 17/56* (2021.01)

(58) Field of Classification Search
  USPC .......................................................... 359/784
  See application file for complete search history.

(56) References Cited

U.S. PATENT DOCUMENTS

2009/0168163 A1\* 7/2009 Frazier .................. G06F 16/217
                                                    359/434
2015/0124341 A1   5/2015 Lai

FOREIGN PATENT DOCUMENTS

| JP | 2002-116491 A | 4/2002 |
| WO | 2007/016718 A1 | 2/2007 |
| WO | 2007/016743 A1 | 2/2007 |
| WO | 2017/193158 A1 | 11/2017 |

\* cited by examiner

EXTENDED MACRO TO WIDE ANGLE CONVERSION LENS

This invention relates to a conversion lens, particularly, but not necessarily solely a macro to wide angle in-water conversion lens.

TECHNICAL FIELD OF THE INVENTION

The field of the invention relates to an optical system for use in under-water photography or cinematography.

Throughout this specification the word "comprise" or variations such as "comprises" and "comprising" may be used. If used, these words will be understood to imply the inclusion of the stated element integer or step, but not the exclusion of any other element, integer or step, or group of elements, integers or steps.

Any discussion of documents, acts, materials, devices, articles or the like which has been included in this specification is not to be taken as an admission that any or all of these matters form part of the prior art base or were common general knowledge in the field relevant to the present disclosure as it existed before the priority date of the application to which this specification relates.

BACKGROUND OF INVENTION

Underwater wildlife photography or cinematography focuses on two very distinct uses. These are macro and wide angle perspective. Macro photography relates to extreme close-up photography where the size of subject is very small and the image that is photographed of the subject is preferably close to or greater than life size. Wide angled photography relates to giving a perspective of a great angle of view and is used underwater especially on big creatures to create a wild and mystic effect of the deep underwater world.

A conventional underwater close-up photography system usually comprises a waterproof flat lens port that is attached to an underwater camera housing with a land macro lens within the lens port. Since these lenses are designed to be used on land, the optical properties of water have not been taken into account and this therefore leads to a reduction of optical performance—such as chromatic aberrations and substantial loss of sharpness due to field curvature/distortion, a term usually used by optical technicians when a lens cannot project a perfectly flat image onto the camera sensor.

Also, conventional macro photography involves using macro lenses of long focal lengths which limit the angle of view to somewhere in the range of 10-15 degrees in order to achieve magnification of the image of the subject to life size or greater than life size. Hence, the lenses can only cover a limited scene of the surrounding background. It is also necessary to get extremely close to the creatures in close-up underwater photography which may scare the creatures away. Also the objects may be obstructed due to the underwater natural environment.

A conventional underwater wide angle photography system usually comprises a waterproof dome port that is attached to an underwater camera housing with a land wide angle lens within the dome port. The system usually suffers from a curved distorted image field due to the refractive index of water and the interface of water against the curved surface of the dome port. Resulting images always exhibit blurring and distortion at corners, loss of sharpness and color fringing. Due to the rather large spherical diameter of the dome port, and the wide angle nature of the lens, it is not possible to take a close-up detailed image of a small subject even when the system is placed extremely close to the subject.

It is therefore an object of the present invention to provide a conversion lens which will obviate or minimize the foregoing disadvantages, or which will at least provide the public with a useful choice.

DISCLOSURE OF THE INVENTION

Accordingly in a first aspect the invention consists in a conversion lens comprising;

An objective lens within a waterproof objective lens housing;

A relay lens within a waterproof relay lens housing; and

A focusing unit within a waterproof focusing unit housing, the objective lens housing, relay lens housing and focusing unit housing being sequentially connectable one to the other and the focusing unit being connectable in use to a lens port forming part of or connectable to an underwater camera housing, and the construction being such that, in use underwater, water may be present within any one or more of the connections.

Preferably using a bayonet connection system,

Preferably the objective lens is formed by a plurality of individual lenses.

Preferably the relay lens is formed by a plurality of individual lenses.

Preferably the focusing unit is formed by a plurality of individual lenses.

Preferably alternative focusing unit can be provided.

Preferably the lens port contains a macro lens.

Preferably alternative objective lenses can be provided.

Preferably the overall length of the alternative objective lenses and the housings within which the objective lenses are provided are of different lengths.

Preferably alternative relay lenses may be provided.

Preferably the overall length of the alternative relay lenses and the housings within which the relay lenses are provided are of different lengths.

Preferably the objective lens is a wide angle lens.

In a further aspect the invention consists in a conversion lens according to any one of the preceding paragraphs mounted on an underwater camera housing or an underwater macro lens port.

This invention may also consist in an alternative optical system designed to provide flexibility in exchangeability in water between macro and wide angle perspective lenses for underwater photography and cinematography.

This invention relates to an optical system comprising various objective lenses specifically designed for water contact without the need of a dome port attached to the front of the system. The objective lenses are also designed to be able to focus extremely closely. The front element diameters of the objective lenses are much smaller than conventional underwater wide angle systems. Hence, one of the possible applications of the optical system in this invention is for taking close-up images of small subjects utilizing a wide angle perspective, which for example, can include a much wider scene of the surrounding background of the subject in comparison to a conventional underwear macro system.

In particular the present invention in a preferred form is constructed by three lens parts. Firstly an objective lens, secondly a relay lens, and thirdly a focusing unit. These parts are each positioned within a separate waterproof housing which separate housings are able to be assembled sequentially, for example, by the use of a bayonet system and then to be attached to an underwater camera housing within which is a camera carrying a macro lens.

All three housing parts are waterproof and therefore can be disassembled and reassembled while the user, and the camera placed within the underwater camera housing, is underwater. The three lenses are interrelated as to their optical performance, but at the same time, allow the lenses to be disassembled and interchanged with corresponding alternative parts without affecting any optical performance. The refractive index of water is taken into account throughout the calculation of each lens design to obtain the best functionality of all three lenses. The exchangeability of the optical system of the invention is extremely useful for underwater photographers and cinematographers and enables them to shoot underwater wildlife creatively, for example by utilizing objective lenses of different angle of view and/or of different front element diameters.

The invention consists in the foregoing and also envisages constructions of which the following give examples.

BRIEF DESCRIPTION OF DRAWINGS

Embodiments of the invention are described hereinafter with reference to the drawings, in which.

BEST MODE OF CARRYING OUT THE INVENTION

Figure 1:
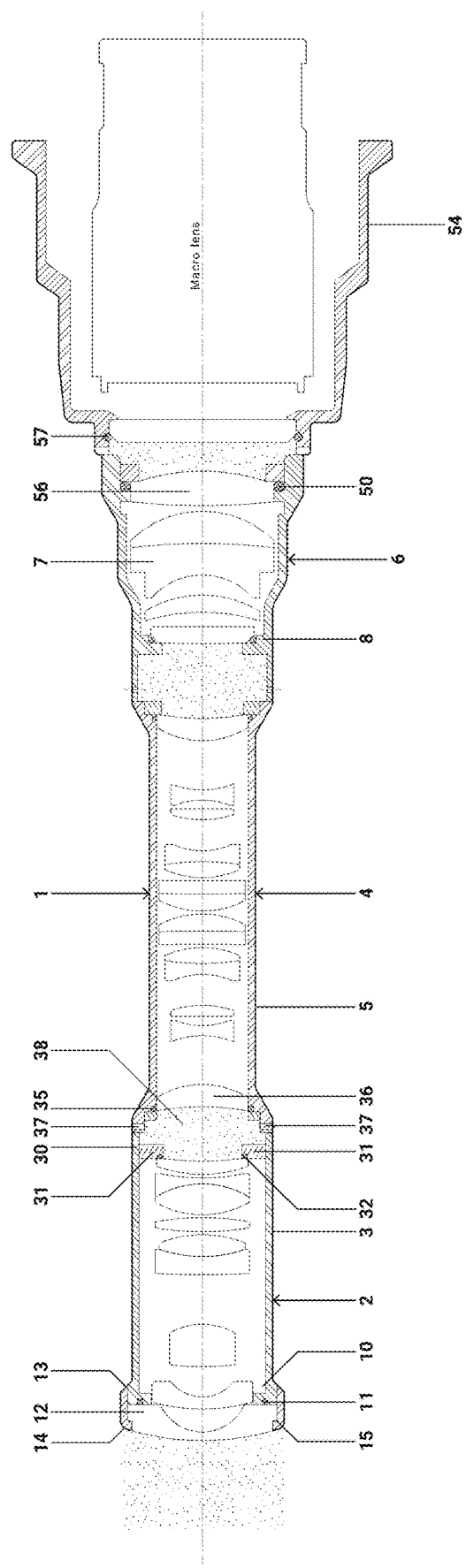
FIG. 1 is a cross-sectional drawing of a side elevation view of a conversion lens according to a preferred form of the invention.

Referring to the drawings a conversion lens 1 is provided formed in the preferred form by an objective lens 2 within a waterproof lens housing 3, a relay lens 4 within a waterproof relay lens housing 5, and a focusing unit 6 formed by a lens 7 within a waterproof focusing unit housing 8.

Although the objective lens, relay lens and focusing unit lens are referred to as, in each case, a single unit it will be clearly seen that in each case these are made up of a number of individual lens elements selected to achieve the result intended by the designer of the conversion lens. The selection of the lens elements to achieve the desired result is determined by the optical designer.

Each housing 3, 5, 8 is substantially waterproof. The precise method by which the waterproofing is obtained is a choice able to be made by the designer but in the construction shown in the figures the use of "O-rings" is shown. The housing 3 has an aperture end wall 10 with an outwardly facing groove into which is positioned O-ring 11. Butting against the O-ring 11 is a lens element 12 which is part of a wide angle or fish-eye lens arrangement. The lens element 12 is kept in position by a band 13 which is tightened onto the circumferential edge of the lens element 12. The band 13 desirably has an inwardly extending flange 14 which becomes positioned in a rebate 15 in the lens element 12. In FIG. 2, which is substantially an enlarged view of the construction shown in FIG. 1, lens elements 16, 17, 18, 19, 20, 21, 22, and 23 are shown by way of example.

At or near the other end 30 of the housing 3 is an inwardly extending rib 31 which carries a further O-ring 32 in a recess against which the lens element 23 abuts. By use of the O-rings 11 and 32 the housing 3 is made substantially waterproof.

The relay lens housing 5 is also made substantially waterproof by the use of O-rings such as O-ring 35 between the housing 5 and a lens element 36. The connection between the housing 3 and the housing 5 may be in any manner such as screw threads or a bayonet fitting for example. FIGS. 8 to 11 show a bayonet fitting construction, which is the preferred construction. However in the construction of FIGS. 1 to 7 one or more bores 37 are provided, in the example shown through the housing 5 into the space 38 between the housings 3 and 5. In the embodiment show two bores 37 are shown. The bores 37 allow water to enter the space 38. The refractive index of water can therefore be taken into account by the lens designer as the existence of water in the space 38 is provided for.

Figure 2:
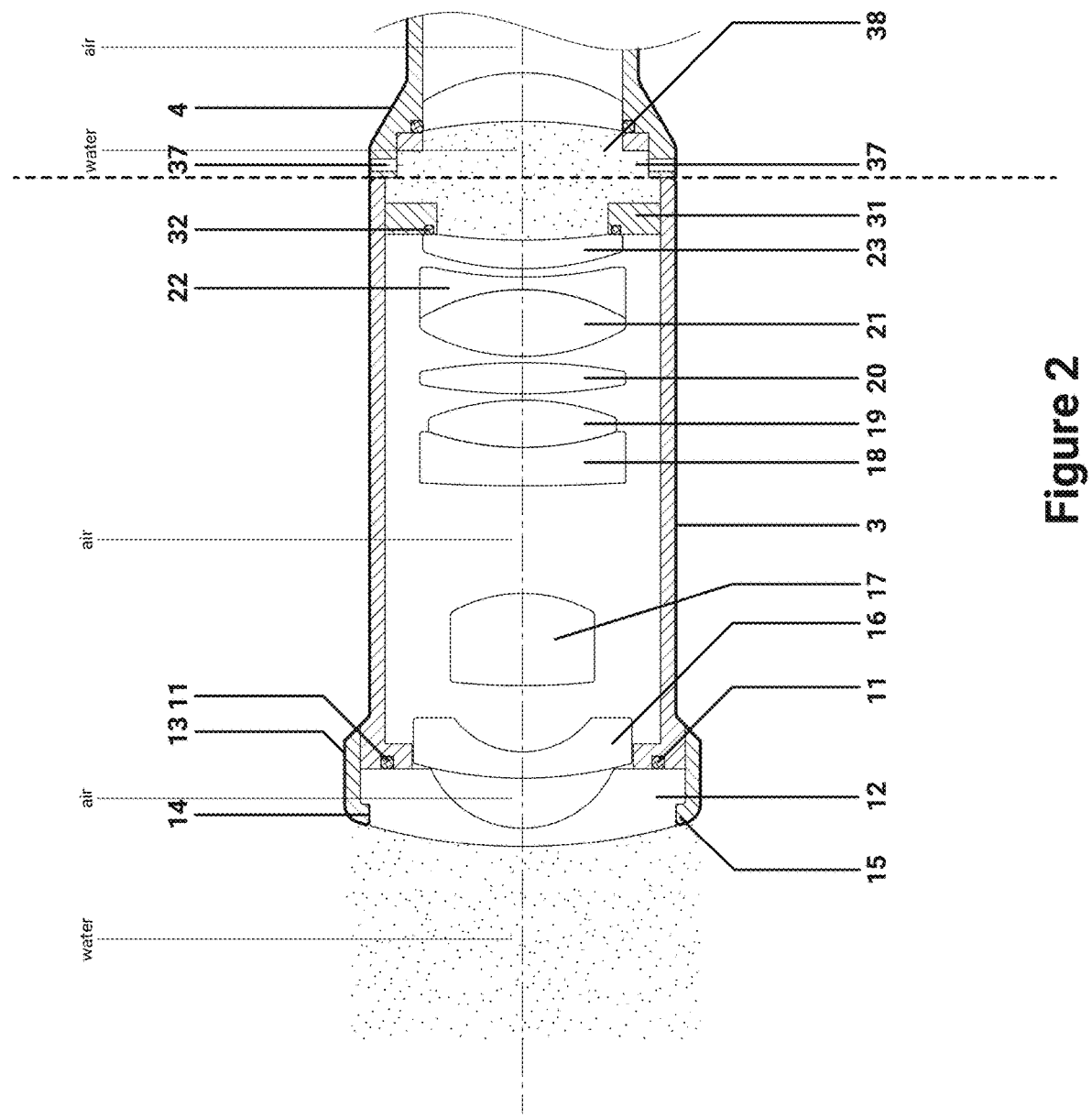
FIG. 2 is a cross-sectional drawing of side elevation view of an objective lens usable in a conversion lens as shown in FIG. 1.
Figure 3:
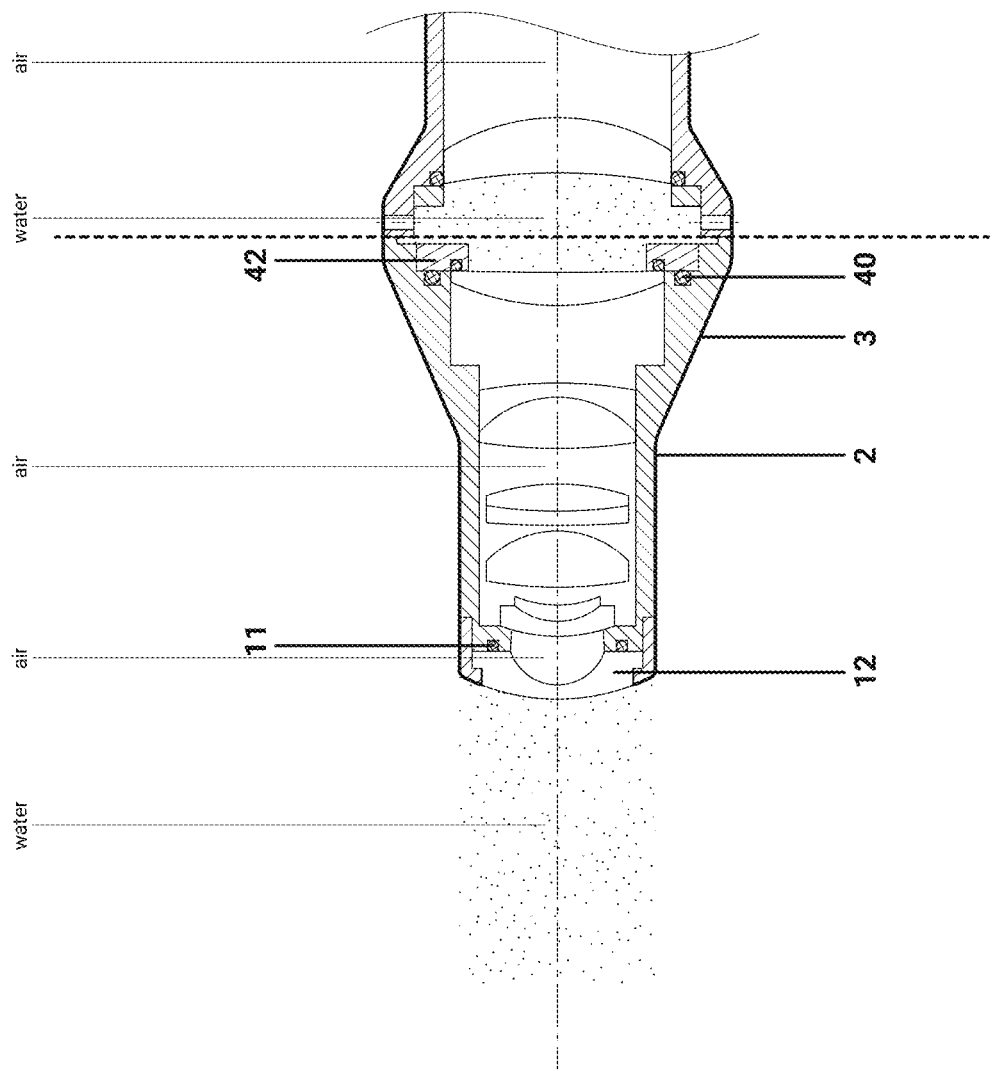
FIG. 3 is a cross-sectional drawing of side elevation of an alternative objective lens according to the invention.

FIG. 3 shows an alternative objective lens 2 which has a smaller front element diameter and an overall shorter length than the lens 2 of FIGS. 1 and 2. The construction is however substantially similar in the use of O-rings to make housing 2 substantially waterproof. In this embodiment a further O-ring 40 is provided in a groove in the end face 41 of the housing 3 which is abutted by the end face 42 of the housing 5.

The housings 3 and 5 could be engaged by a screw thread or in any other useful way. Again water is admitted to the space between the housings 3 and 5.

Figure 4:
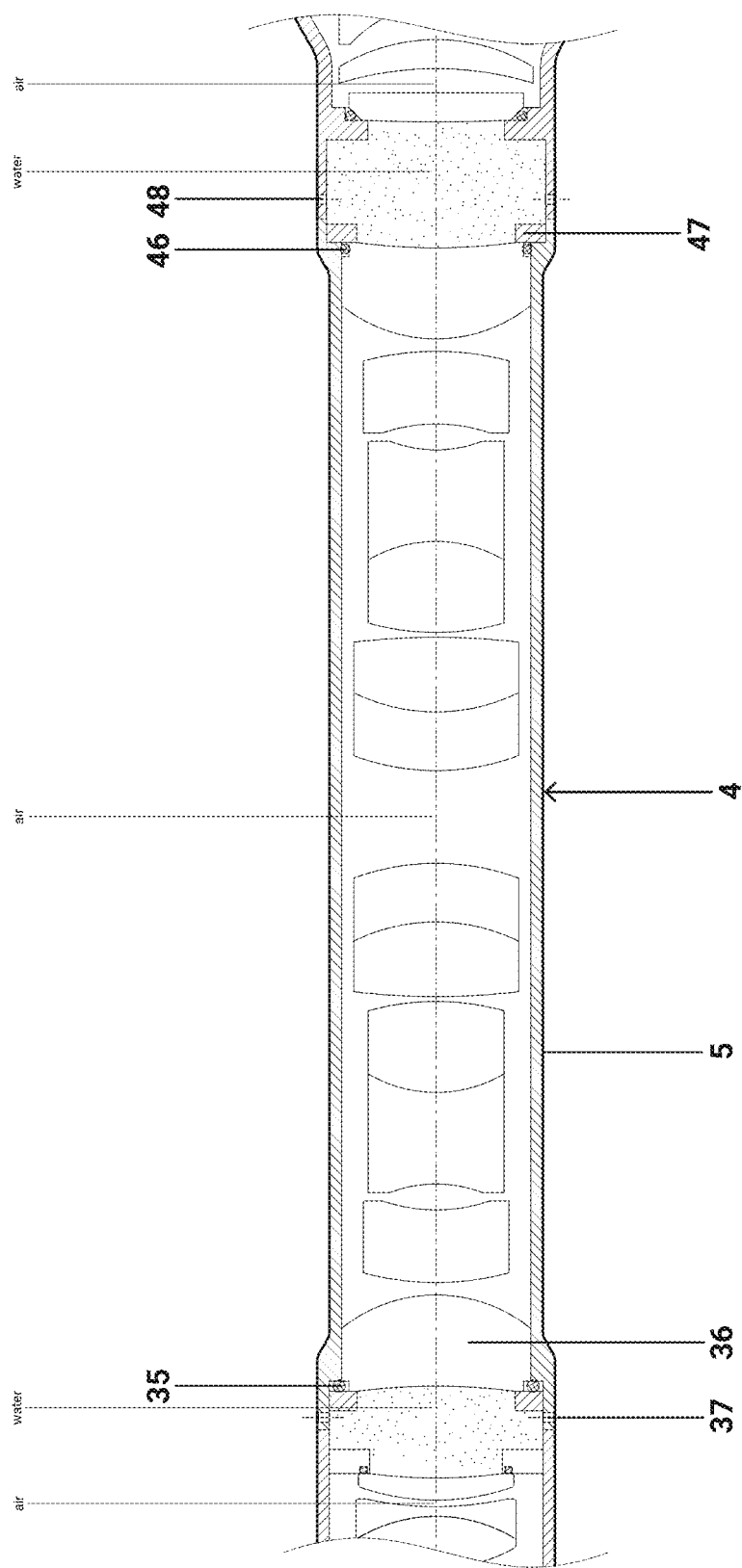
FIG. 4 is a cross-sectional drawing of a relay lens usable in a preferred form of the invention.

Referring to FIG. 4 the other end 45 of the relay lens 4 is engage able with the focusing unit 6 again, for example, by the use of O-ring seals 46 abutting an inward flange 47 on the focusing unit 6.

One or more bores 48 are provided to again allow water to enter into the space 49 between the housing 5 and the housing 8.

Figure 5:
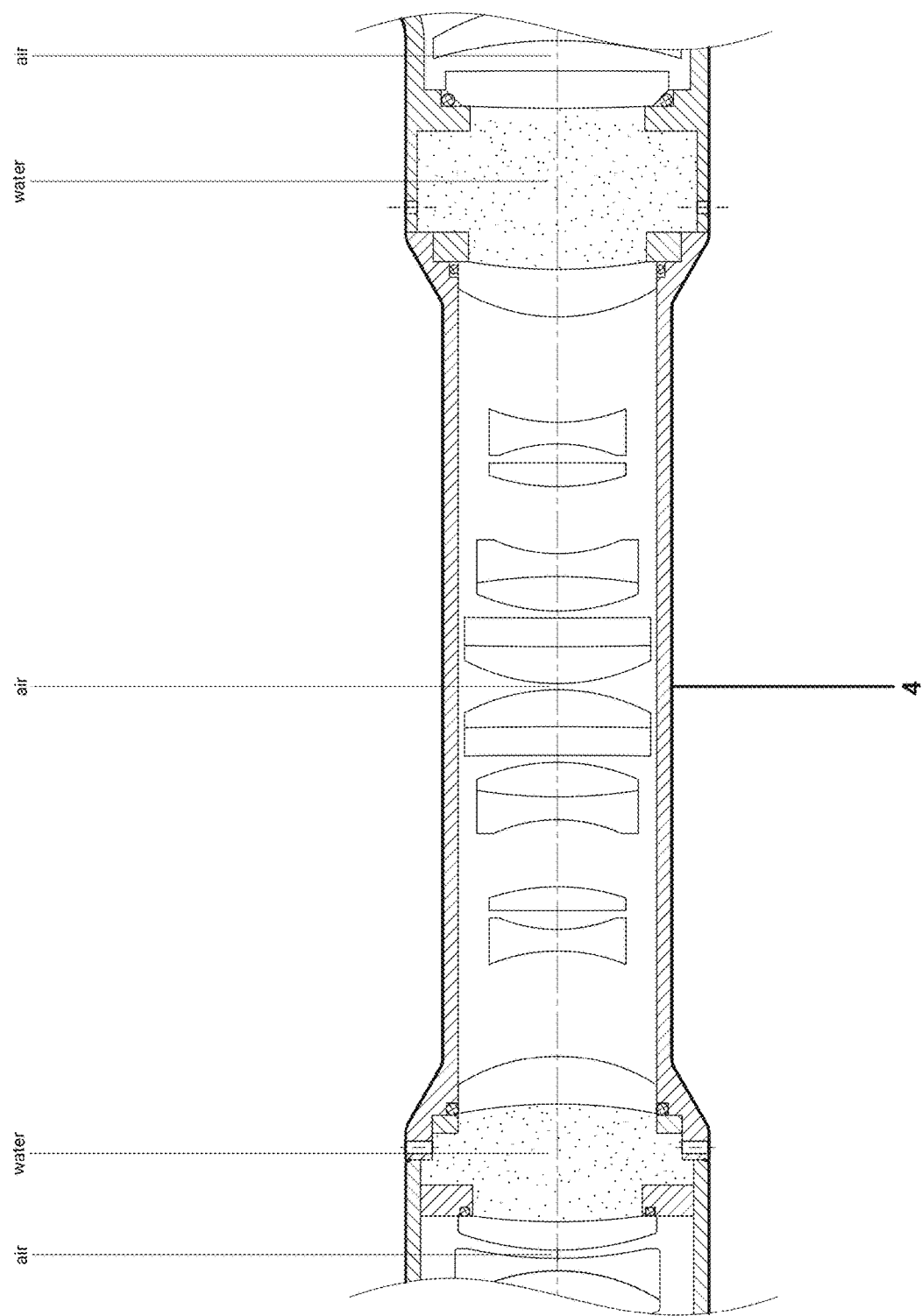
FIG. 5 is a cross-sectional drawing of an alternative relay lens according to the invention.

FIG. 5 shows an alternative relay lens 4, which is substantially the relay lens 4 as shown in FIG. 1.

Figure 6:
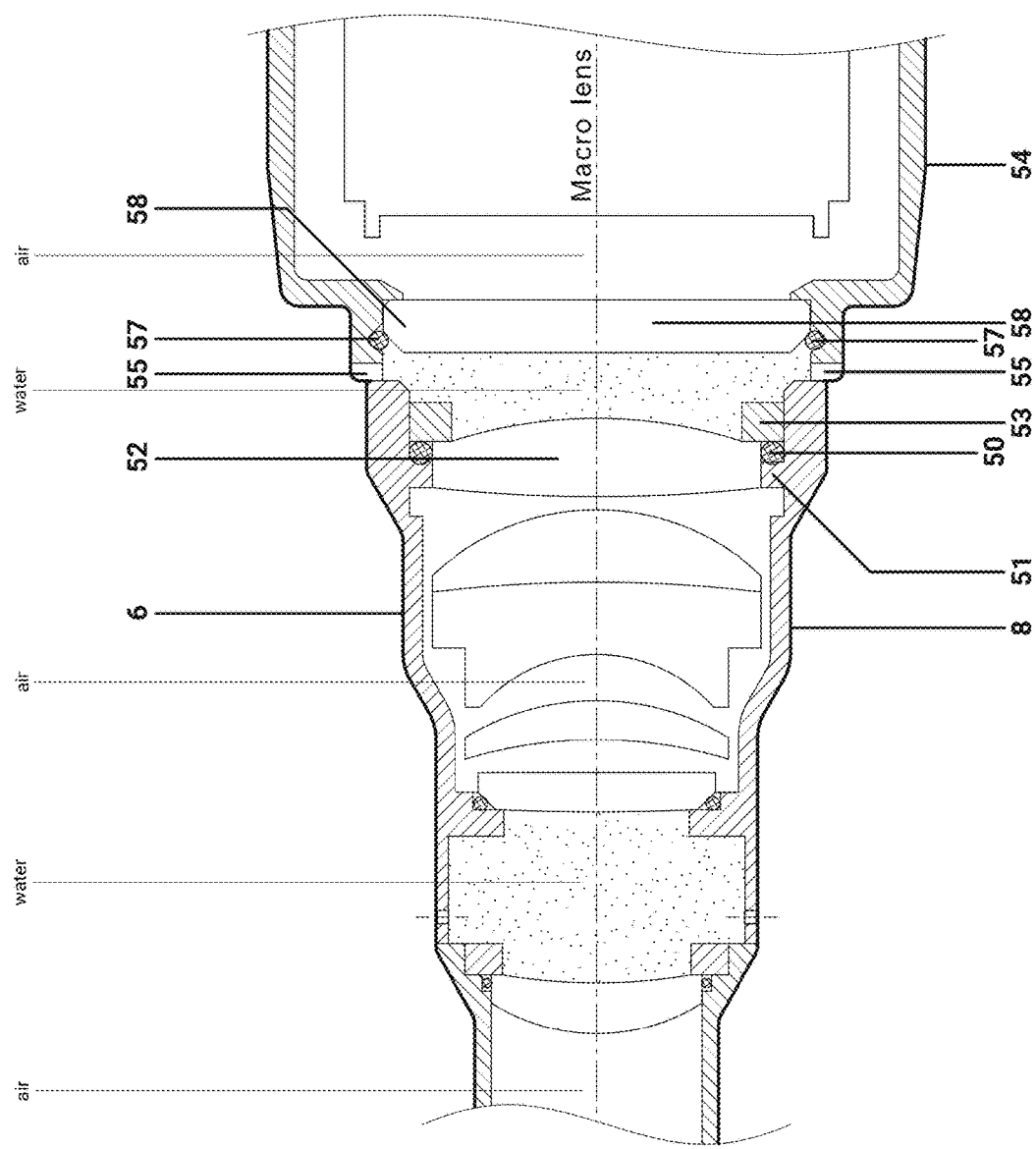
FIG. 6 is a cross-sectional view of a focusing unit usable in the preferred form of the invention.

FIG. 6 shows the focusing unit 6 which again is waterproofed by the use of an O-ring 50 held in use between the housing 8, an inward flange 51 forming part of the housing 8, a lens element 52 and a male spigot or threaded part 53 forming part of a macro lens port 54. Again bores 55 are provided to allow water to enter the space 56 between the focusing unit 6 and the macro lens port 54. A seal between the macro lens port 54 and its lens 58 can be achieved by an O-ring 57. The end of the focusing unit 6 remote from the lens port 54 can be sealed against water ingress by an "O-ring" in substantially the same manner.

Figure 7:
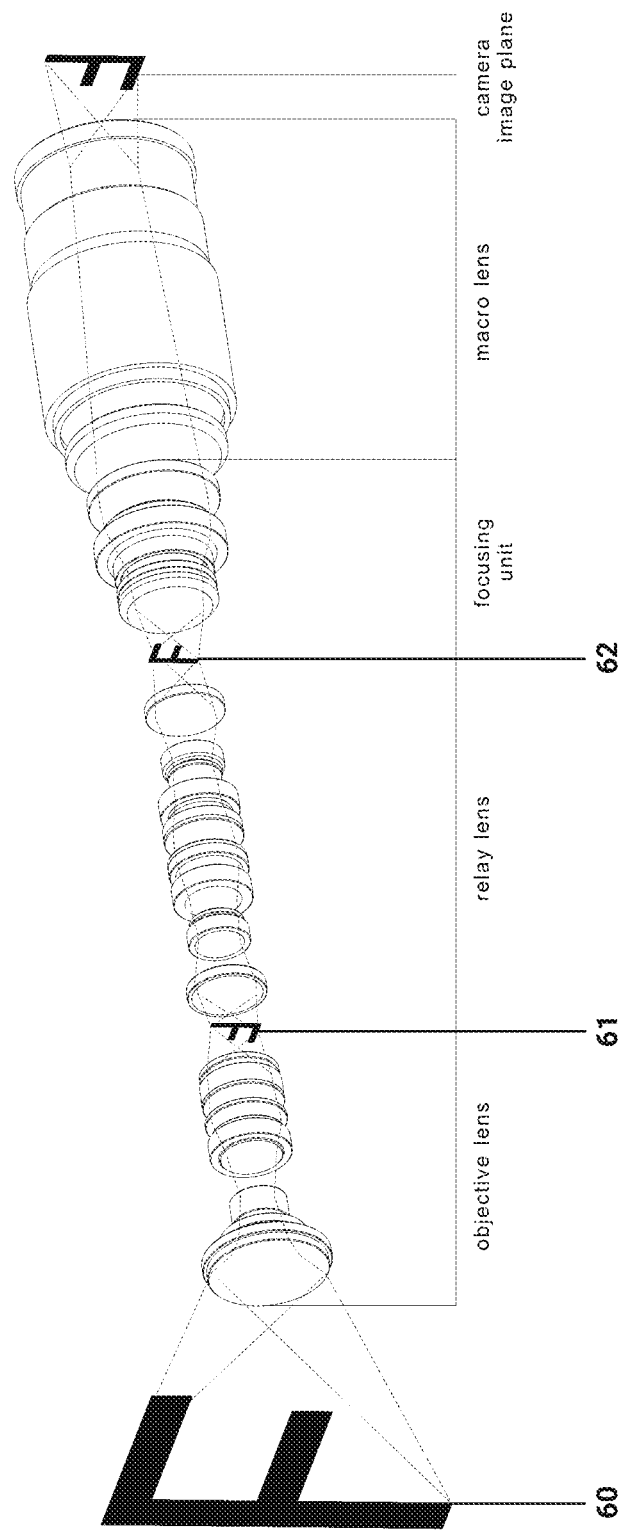
FIG. 7 is an exploded perspective view of the conversion lens of FIG. 1.

FIG. 7 shows the passage of an object "F" through the conversion lens of the present invention. The object "F" which is depicted as large at 60 is seen through the objective lens 2 where it is shrunk and inverted at 61. The relay lens 4 inverts the image at 62 allowing the image to be transmitted through the focusing unit and macro lens to the camera sensor (not shown) at an appropriate size and orientation. In a typical embodiment the objective lens 2 forms an intermediate image which is about half the size of a full frame camera sensor. The relay lens focuses the image from the objective lens into a 1:1 image in front of the focusing unit. The focusing unit and macro lens together focus the final image onto the sensor of the camera.

Figure 8:
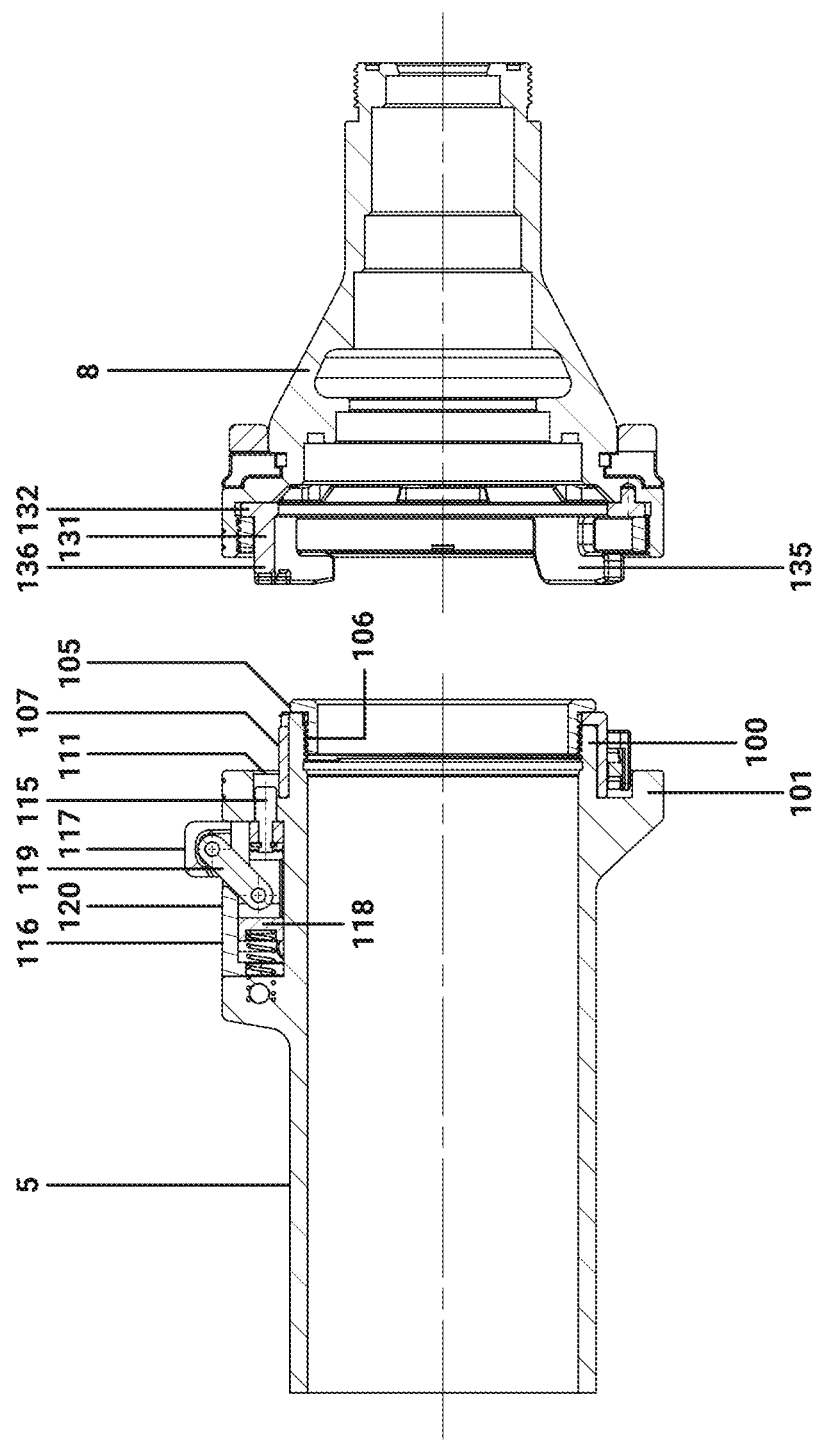
FIG. 8 is a cross-sectional view of an alternative embodiment of the connection between a relay lens housing and an objective lens housing.
Figure 9:
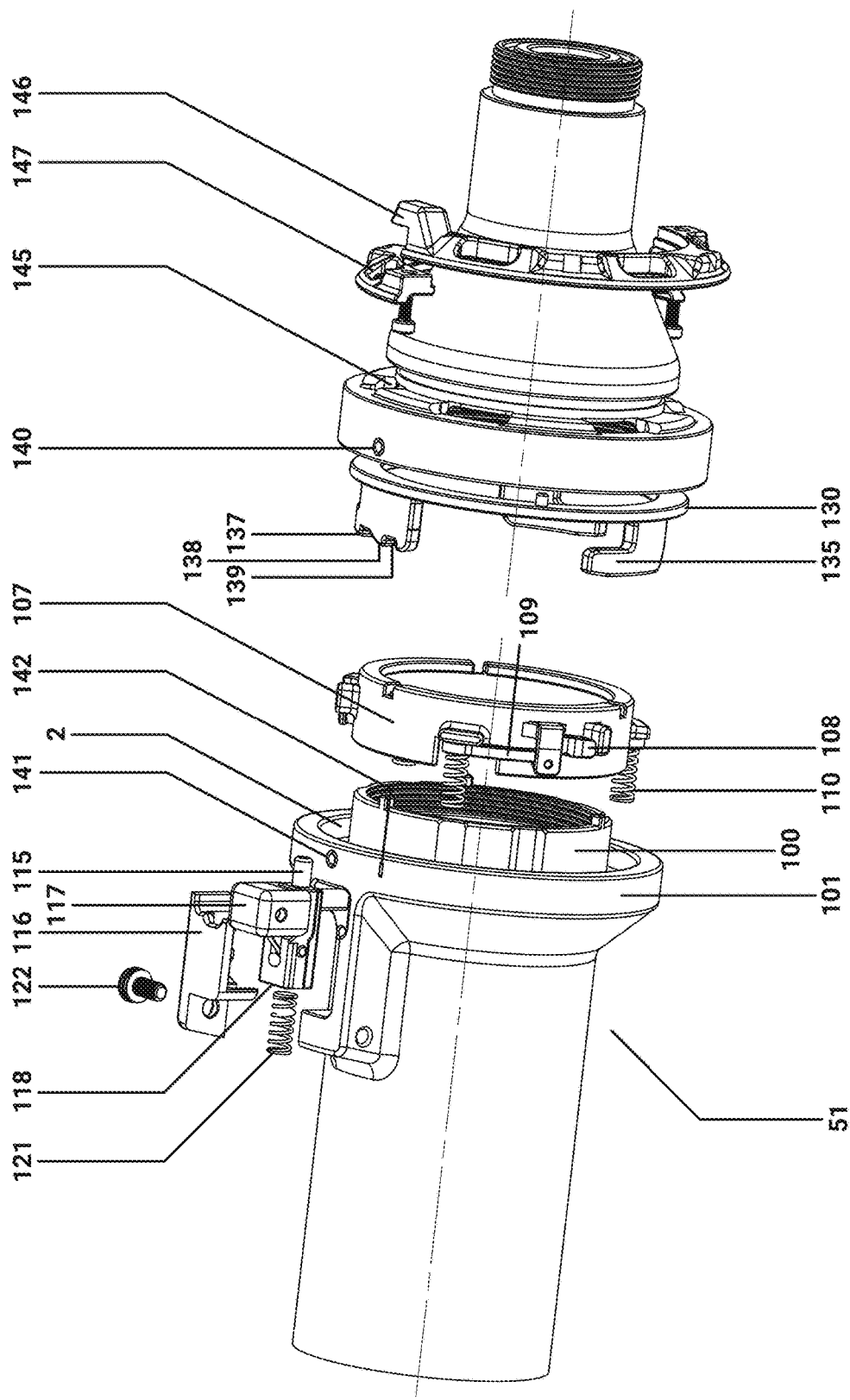
FIG. 9 is an exploded view of a connection according to FIG. 8.

Referring now to FIGS. 8 and 9, the relay lens is able to be connected to the objective lens housing 3 by a form of bayonet connection. End 100 of the housing 3 is surrounded by a shroud 101 which forms a slot 102 between the end 100 and the shroud 101. A locking ring 105 is able to be engaged with the inner surface of the end 100 by means of inter-engaging threads at 106.

Also held in place by the locking ring 105 is a claw assembly 107 which is positioned in the slot 102 and which has mounted thereon a pendulum 108, a hinge shaft 109, and a compression spring 110. The claw assembly when in position leaves a gap 111 between the outer surface of the claw assembly 107 and the inner surface of the shroud 101. A limit boss 112 is also provided on the claw assembly 107. Multiple hinge shafts 109 can be provided, for example three hinge shafts 109 evenly distributed circumferentially around the claw assembly 107.

Positioned in the gap 111 is a pin 115 which is held in a housing 116 which carries a release button 117. Within the housing 116 is a slider 118 which is able to move within the housing 116 and which is connected to the release button 117 by a connecting arm 119 which is pivotally connected to the release button 117 at one end and to the slider 118 at the other end. A slot 120 is provided in the housing 116 in which the connecting arm 119 can move. A spring 121 is provided which bears on the slider 118 and is held in place by a pin 122 which passes through aligned apertures in the housing 116 and the turns of the spring 121. The pin 122 is held within the slider 118 in any suitable manner such as a pin passing through aligned apertures in the pin 115 and receiving depression in the slider 118.

Mounted on the objective lens housing 3 is a buckle body 130 which is held within the end of the objective lens housing by a threaded locking ring 131 bearing on an outwardly extending rib 132 extending from the buckle body 130.

Extending outwardly from the buckle body 130 is a buckle or hook 135 positioned to engage the pendulum 108 and a plate 136 position to be engaged by the pin 115. The plate has two recesses. The first recess 137 has a sloped edge 138 and the second recess 139 has edges that are substantially perpendicular to the edge of the plate so that the pin becomes locked in the recess 138 during use.

Locating marks 140, 141 and 142 may be provided on the shroud 101 and the objective lens housing 3.

As the objective lens housing 3 and the relay housing 5 are moved together the buckle or hook 135 is first in contact with the pendulum 108 as the lenses rotate in opposite directions. As the lenses rotate further the buckle or hook 135 pushes the pendulum 108 through the hinge shaft 109 and compresses the spring 110 until the two lens housings are fully engaged. This method of connecting absorbs direct force and friction between the claw assembly 107 and the buckle or hook 135. The locating marks enable the correct positioning during this operation.

Figure 11:
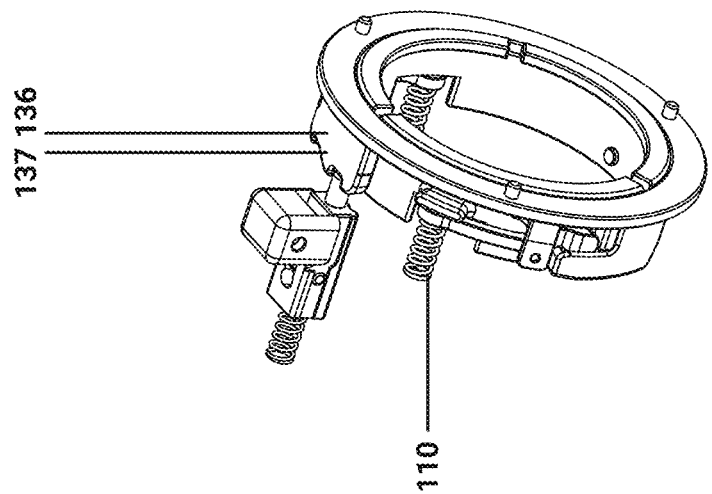
FIG. 11 is a view as in FIG. 10 but in a locked position.
Figure 10:
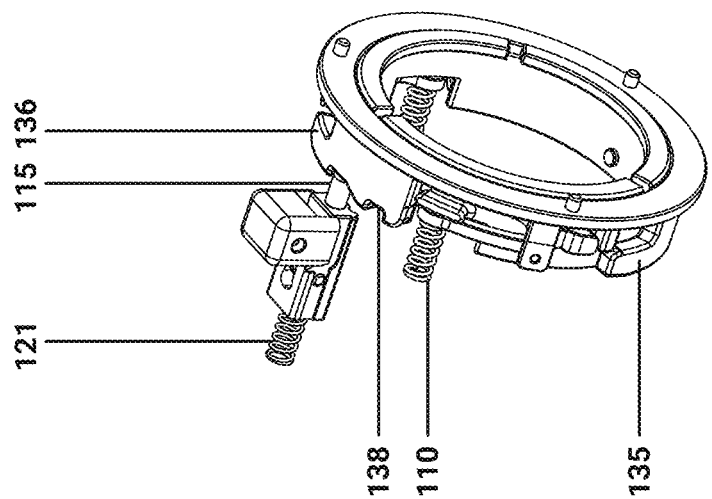
FIG. 10 is a perspective view of the connection of FIG. 8 in an unlocked position.

FIG. 10 shows the engagement mechanism at the start of the procedure and FIG. 11 shows the position when engagement is complete.

While the above steps are being taken the edge of the plate 136 engages the pin 115 pushing it and the slider 118 backwards against the pressure of spring 121. The pin 115 will successively ride into recess 136 and along the sloped edge 137 and ultimately becoming positioned in recess 138. To remove the two lens housings the button 117 is pulled back against the pressure of spring 121 allowing the buckle or hook 135 to be roved from the claw assembly and releasing the two lens housings one from the other.

As before water is intended to be present in the connection and one or more water inlet s 145 are provided to allow this to happen. Associated with the water inlet 145 or each water inlet 145 may be shades 146 and 147.

A connection between the relay housing 4 and focusing unit housing 8 can be provided in a similar manner.

Thus the housings are interchangeable with the bayonet connection system, as well as the first described system.

INDUSTRIAL APPLICABILITY

The invention allows a camera housing for underwater use having a macro lens in a suitable port to be readily changed from a macro configuration to a wide angle configuration while underwater. The macro configuration is changed to a wide angle configuration simply by adding a waterproof focusing unit, a relay lens and an objective lens in sequence to the macro port.

Providing alternative relay lens units and alternative objective lens units allows the overall physical length of the conversion lens in the embodiments shown to be varied to about 13 to 14 inches depending on which objective lens is being used.

Advantages

The invention provides underwater exchangeability between macro and wide angle lenses, for underwater still photography or cinematography. The number of parts in the optical system can be extended or reduced in order to change the length and perspective of this conversion lens.

Individual parts can be exchangeable by disconnecting one or more lens housings and replacing those with alternative lens housings.

Since the lens housings can be disassembled and reassembled in-water, it is possible to alter and change the length of lens. It is a great advantage to be able to extend or reduce the length of lens, firstly for reducing the risk of scaring away or disturbing the creatures while shooting particularly in the wide angle configuration, secondly for the diver's safety by keeping the diver distant from the creature being photographed. This in-water alteration of lens length is an advantage because one cannot predict what the surrounding environment will be when shooting.

This invention also provides for the use of different sized diameter of objective lens. The provision of a variety of sizes at the front element of the objective lens offers different field of view perspectives. The optical system is designed for shooting within different surrounding environments. It is an advantage for underwater photographers and cinematographer to be able to shoot underwater creatures at a very close proximity to the lens but having the diver far away in any environment with very informative detail and texture as well as giving context of the background. It is possible with the invention to shoot inside caves, inside corals and from the creatures' point of view, this opens up lots of shooting possibilities with different method of underwater creative shooting.

Having any individual parts exchangeable, the focusing unit can also be changed. With this ability to change lens parts, this conversion interchangeable lens can be used with any camera with any sized sensor together with a range of macro lenses.

Finally, the sequential assembly of three interchangeable parts, provides a conversion from macro to a wide angle lens that is between a rectilinear and fisheye perspective, therefore there will be less distortion than a conventional fisheye lens which gives a more natural perspective for underwater wildlife photography and cinematography with a flexible, creative and imaginative shooting.

It will of course be realised that while the foregoing has been given by way of illustrative example of this invention, all such and other modifications and variations thereto as would be apparent to persons skilled in the art are deemed to fall within the broad scope and ambit of this invention as is hereinbefore described and as claimed.

The invention claimed is:

1. A conversion lens comprising;
   an objective lens within a waterproof objective lens housing;
   a relay lens within a waterproof relay lens housing; and
   a focusing unit within a waterproof focusing unit housing,
   wherein the objective lens housing, the relay lens housing, and the focusing unit housing are sequentially connectable one to the other and disconnectable one from the other, and
   wherein the focusing unit is, in use, connectable to a lens port forming part of or connectable to an underwater camera housing, and the construction being such that, in use underwater, water is present within one or both of i) a connection between the objective lens housing and the relay lens housing, and ii) a connection between the relay lens housing and the focusing lens housing.

2. The conversion lens as claimed in claim 1 wherein a bayonet connection system is used.

3. The conversion lens as claimed in claim 1 wherein the objective lens is formed by a plurality of individual lenses.

4. The conversion lens as claimed in claim 1 wherein the relay lens is formed by a plurality of individual lenses.

5. The conversion lens as claimed in claim 1 wherein the focusing unit is formed by a plurality of individual lenses.

6. The conversion lens as claimed in claim 1 wherein alternative objective lenses are provided.

7. The conversion lens as claimed in claim 6 wherein the overall length of the alternative objective lenses and the housings within which the objective lenses are provided are of different lengths.

8. The conversion lens as claimed in claim 1 wherein the lens port contains a macro lens.

9. The conversion lens as claimed in claim 1 wherein alternative relay lenses may be provided.

10. The conversion lens as claimed in claim 9 wherein the overall length of the alternative relay lenses and the housings within which the relay lenses are provided are of different lengths.

11. The conversion lens as claimed in claim 1 wherein the objective lens is a wide angle lens.

12. The conversion lens according to claim 1 mounted on an underwater camera housing or an underwater macro lens port.

13. An optical system exchangeable in water between macro and wide angle perspective lenses for underwater photography and cinematography, the optical system comprising a lens assembly including:
   an objective lens housing containing objective lenses which provide a wide angle perspective lens;
   a relay lens housing containing a relay lens; and
   a focusing unit housing containing a focusing unit,
   wherein the optical system is exchangeable in water between the macro and wide angle perspective lenses for underwater photography and cinematography by mounting the lens assembly on a camera or a lens port, a connection between the objective lens housing and the relay lens housing, or/and a connection between the relay lens housing and the focusing housing, allowing water to be present therein while the optical system is in use underwater.

14. The optical system as claimed in claim 13, wherein at least one of interchangeable objective lens housings, relay lens housings, and focusing unit housings are provided.

* * * * *